3,766,158
PROCESS FOR POLYMERIZATION OF OLEFINS
Kazuo Yamaguchi, Tokyo, Toru Tanaka and Shigeaki Okano, Yokohama, Nobuo Enokido, Kawasaki, and Hidetoshi Saruwatari, Yokohama, Japan, assignors to Mitsubishi Chemical Industries, Ltd., Tokyo, Japan
No Drawing. Filed June 4, 1971, Ser. No. 150,180
Claims priority, application Japan, June 6, 1970, 45/48,883
Int. Cl. C08f 1/42, 3/06
U.S. Cl. 260—88.2 R  8 Claims

ABSTRACT OF THE DISCLOSURE

Olefin polymerization is conducted using a two component catalyst system comprising (1) a hydrocarbon insoluble solid prepared by reducing a mixture of titanium tetrahalide and trialkyl vanadate with an organo aluminum compound and (2) an organo aluminum compound.

BACKGROUND OF THE INVENTION

Field of the invention

This invention relates to a process for polymerization of an olefin. More particularly, this invention relates to an improved process for polymerizing an olefin using a novel catalyst.

Description of the art

It has been well-known that a number of catalyst containing compounds of Groups IVa–VIa transition metals and the Groups I–III organometallic compounds, of Mendeleeff's Periodic Table, are effective for the polymerization of olefins at relatively low temperatures under relatively low pressures.

However, these conventional catalysts have not proven to be entirely satisfactory from an industrial point of view for the following reasons: Conventional catalysts require some separation procedures to remove the residue of the catalyst. It would be a significant advantage to be able to provide a high polymerization activity catalyst which does not adversely affect the resulting polyolefin so that separation of the catalyst from the polyolefin can be dispensed with.

Conventional catalysts are inadequate to provide polyolefins with a high degree of productivity by slurry polymerization at relatively low temperatures. Productivity is significantly affected by the bulk density of the resulting product. High productivity is provided by high bulk density. On the other hand, the sharpness of the particle size distribution of the resulting polymer also affects productivity as well as the handling of the polymer. The sharper the distribution, the easier is the handling. Conventional catalysts however were not capable of providing a sharp, or narrow, particle size distribution and hence the productivity was low.

SUMMARY OF THE INVENTION

Accordingly, it is an object of this invention to provide an industrially acceptable process for polymerization of olefins with a high degree of productivity.

It is another object of this invention to provide a process for polymerization of olefins using a catalytic system characterized by high catalytic activity, wherein the necessity of removing the catalyst from the resulting product can be omitted, and wherein the polymer is produced in a narrow distribution of particle size, and high bulk density.

These and other objects have now herein been attained by using a first catalyst component of a hydrocarbon insoluble solid containing titanium, vanadium and aluminum, and a second catalyst component of an organic aluminum compound. More particularly, these objects have been attained by using a two catalyst component system comprising a first catalyst component of a hydrocarbon insoluble solid, prepared by reducing a mixture of titanium tetrahalide and trialkyl vanadate, with an organo aluminum compound, and a second catalyst component comprising an organo aluminum compound.

DETAILED DESCRIPTION OF PREFERRED EMBODIMENTS

The first catalyst component is a hydrocarbon insoluble solid which is prepared by mixing titanium tetrahalide and tri-alkyl vanadate, and then reducing the mixture with an organo aluminum compound. The ratio of the trialkyl vanadate to titanium tetrahalide is preferably V/Ti=0.1–10.

Suitable titanium tetrahalides used in the preparation of the first catalyst component includes titanium tetrachloride, titanium tetrabromide and titanium tetraiodide.

Suitable trialkyl vanadates used in the preparation of the first catalyst component includes those compounds having the general formula:

$$VO(OR)_3$$

wherein R represents an alkyl group of 1–20 carbon atoms. Exemplary of such compounds are trimethyl vanadate, triethyl vanadate, tri-n-propyl vanadate, triisopropyl vanadate, tri-n-butyl vanadate, and triisobutyl vanadate, etc.

The titanium tetrahalide and the trialkyl vanadate are reduced with the organo aluminum compound. This can be accomplished immediately subsequent to forming the mixture, however, it is advantageous to heat the mixture prior to the reducing treatment, since this procedure tends to increase the catalytic activity of the hydrocarbon insoluble solid.

It is not clear however what type of reaction occurs between the titanium tetrahalide, and the trialkyl vanadate, during the heat treatment, but it does provide advantageous results. It has been theorized that a condensation type de-haloalkyl reaction occurs between the titanium tetrahalide and trialkyl vanadate, since quantities of alkyl halide and high molecular weight compounds containing titanium and vanadium, were found subsequent to heat treatment.

When heat is applied prior to the reduction treatment the temperature should be from 70°–300° C., preferably 70–170° C., and especially 90–140° C. The time period required for said heat treatment will depend upon the presence of a solvent, the type of solvent and the temperature of the heat treatment. When an inert solvent is used, a longer period is required relative to treatment without a solvent.

For example, it is preferable to heat at 90° C. for less than 5 hours, or to heat at 140° C. for less than 1 hour, in the absence of solvent. However, it is possible to heat at 140° C. for more than 1 hour in the presence of solvent.

Suitable inert solvents used for the heat process include such hydrocarbons as n-hexane, n-pentane, n-octane, isooctane, cyclohexane, benzene, toluene, xylene, tetrahydronaphthalene, and decahydronaphthalene etc. The mixture of titanium tetrahalide and trialkyl vanadate, or the product resulting from the treating of the mixture, is reduced with an organo aluminum compound, and thereafter, if necessary, diluted with a solvent. The resulting hydrocarbon insoluble product is then washed with a solvent to obtain the first catalyst component.

Suitable solvents used for this portion of the process include the inert hydrocarbon solvents, such as n-pentane, n-hexane, n-octane, isooctane, and cyclohexane.

The organo aluminum compounds used as the reducing agent, have the general formula:

$$AlR_nX_{3-n}$$

wherein R represents a hydrocarbon group of 1–14 carbon atoms; X represents a halogen atom; and $n$ is an integer of from 1–3.

Typical examples of suitable organo aluminum compounds include trialkyl aluminum, such as triethyl aluminum and triisobutyl aluminum, dialkyl aluminum monohalide, such as diethyl aluminum monochloride, diisobutyl aluminum monochloride and dibenzyl aluminum monochloride; alkyl aluminum sesquihalides, such as ethyl aluminum sesquichloride, and isobutyl aluminum sesquichloride.

In order to obtain a polymer having a high bulk density and a narrow particle size distribution, it is especially preferable to use dialkyl aluminum monohalide or alkyl aluminum sesquihalide, such as diethyl aluminum monohalide, dibutyl aluminum monohalide and ethyl aluminum sesquihalide, wherein $n=2$ or $n=1.5$. The reduction of said mixture can be conducted at $-20°$ C.–$150°$ C., preferably $0°$ C–$130°$ C. Usually, it is preferable to effect reduction at about room temperature. Successful results are also obtainable by reducing the mixture at $-20°$ C.–+$30°$ C. and then ageing it at $60°$ C–$150°$ C.

The most effective results in terms of bulk density are obtainable when the mixture contains more than 0.5 mole/l., and especially 1–3 mole/l. transition metal concentration (total concentration of titanium compound and vanadium compound), and is prepared by reducing the mixture at a temperature of from 0–30° C.

The second catalyst component is an organo aluminum compound having the general formula:

$$AlR'_nX_{3-n}$$

wherein R' represents hydrogen, an alkyl group or an aryl group; X represents a halogen atom, alkoxy group or trialkyl siloxy group of $-OSiR_3$; and $n$ represents an integer of from 1–3.

Typical examples of such organo aluminum compounds include trialkyl aluminum, such as triethyl aluminum, tripropyl aluminum and tributyl aluminum; dialkyl aluminum halide, such as diethyl aluminum chloride, diethyl aluminum bromide, dibutyl aluminum chloride and dibutyl aluminum bromide; alkyl aluminum dihalide, such as ethyl aluminum dichloride and butyl aluminum dichloride; dialkyl aluminum alkoxide, such as diethyl aluminum ethoxide and diethyl aluminum methoxide; pentaalkyl siloxy allene, such as pentaethyl siloxy allene; alkyl aluminum alkoxy halide, such as ethyl aluminum ethoxychloride; alkyl aluminum sesquihalide, such as ethyl aluminum sesquichloride and butyl aluminum sesquichloride.

In the process of this invention, the olefin polymerization is conducted either continuously or batch-wise, in accordance with conventional polymerization processes using Ziegler catalysts.

That is, the olefin polymerization is carried out in the presence of the catalyst system described above preferably in an inert medium at 0–150° C., preferably 50–100° C., under a reaction pressure of 0–100 kg./cm.², preferably 1–20 kg./cm.².

The ratio of said second catalyst component to the first catalyst component may be from 0.1–100, preferably 1–30, in terms of Al/Ti+V (molar ratio).

The inert mediums useable in this process are the inert hyrocarbons, such as propane, butane, pentane, hexane, heptane, octane, isooctane, and cyclohexane.

Polymerization can be effected by solution polymerization, slurry polymerization or vapor phase polymerization, however, slurry polymerization is especially preferred from the industrial view point. When slurry polymerization is used, it is possible to conduct the polymerization in the presence of low concentrations of the first catalyst compound, the order of 0.1–20 mg., and the quantity of the second catalyst component, the organo aluminum compound, may be used in amounts of 0.001–10 mmole per 1 l. of said inert medium.

The yield of polymer is 10–50 kg./g. based on the weight of the first catalyst component so that the process of this invention can be accomplished without separation of the catalyst.

The olefins which may be polymerized according to this invention include the 1-olefins, such as ethylene, propylene and butene-1. It is especially preferable to use ethylene or a mixture of ethylene with another α-olefin. Such secondary α-olefins used for copolymerization of ethylene preferably have the general formula:

$$CH_2=CH-R$$

wherein R is a hydrocarbon residue of 1–18 carbon atoms. Typical examples of said α-olefins include propylene, butene-1, pentene-1, hexane-1, 4-methylpentene-1, octene-1, decene-1, dodecene-1, octadecene-1, styrene, and butadiene.

Hydrogen may be present in the polymerization reaction system, since it helps control the average molecular weight and the other physical properties of the resulting polymer.

As stated above, the catalyst used for the process of this invention has a remarkably high polymerization activity, so that the amount of catalyst remaining in the resultant polymer is quite low. Accordingly, the polymer is useable and unaffected by the presence of the catalyst, so that separation of the catalyst from the product can be dispensed with.

When a slurry system is used, high bulk density polymer particles are obtainable so that product handling is quite easy and high productivity is obtainable.

Having generally described the invention, a further understanding can be obtained by reference to certain specific examples which are provided herein for purposes of illustration only and are not intended to be limiting in any manner unless otherwise specified. In the following examples, the term of "catalytic efficiency" means a yield of polymer per gram first catalyst component (kg. PE/g. cat.).

EXAMPLE 1

(a) Preparation of first catalyst component 100 ml. of cyclohexane, 18 mmoles of titanium tetrachloride and 17 mmoles of tri-n-butyl vanadate were charged to 500 ml. flask, filled with argon. Then 26 mmoles of ethyl aluminum sesquichloride were charged at 20° C. and reacted for 1 hour. After the reaction, unreacted components and solvent were removed and the resulting solid was further washed 4 times, with cyclohexane. The product was dried at 60° C. in a vacuum of 1 mm. Hg for 2 hours and 6 g. of a powdery solid of first catalyst component was obtained.

(b) Polymerization 500 ml. of n-hexane, 5.0 mg. of said first catalyst component and 0.10 mmole of tri-isobutyl aluminum were charged to a one liter autoclave containing an atmosphere of nitrogen gas. The autoclave was heated at 90° C. and hydrogen was charged replacing nitrogen with hydrogen to 5.0 kg./cm.² of hydrogen pressure. Ethylene was further charged to maintain the total pressure at 10 kg./cm.². The polymerization temperature was controlled at 90° C. and ethylene was charged to maintain the total pressure at 10 kg./cm. during the reaction. The polymerization was conducted under constant pressure for 130 minutes. As a result, 155 g. of a white powdery polyethylene, having an average M.W. of 52,000 was obtained. Accordingly, the catalytic efficiency was 31.0 kg. PE/g. cat. The bulk density of the resulting polyethylene was 0.30 g./cc. (In the examples, the bulk density was measured by ASTM D-392-38.) The Rosin-Rammler's constant (n) of the polyethylene powder was 3.5 in size distribution. In the examples, the Rosin-Rammler's constant (n) is the particle size distribution and is shown by the following formula:

$$R = 10^{-bD^n}$$

wherein D represents the average particle size; and R represents the ratio of particles of more than D of diameter (residue) to total articles.

In the formula, the particle size distribution is narrow and the uniformity of the particle size is high, where $n$ is high, while the average particle size is small, where $b$ is high.

REFERENCE I

The process of Example 1 was repeated, except that tri-n-butyl vanadate was not used. As the result, polyethylene having an average molecular weight of 97,000 and a bulk density of 0.35 g./cc. was obtained in a 3.0 kg. PE/g. cat. of catalytic efficiency. Also the process of Example 1 was repeated, except the titanium tetrachloride was not used. As the result, a powdery solid polyethylene was not obtained. The process of Example 1 was repeated, except vanadium tetrachloride was used at a molar ratio of V/Ti of 0.6, instead of the tri-n-butyl vanadate. This resulted in polyethylene having an average molecular weight of 73,000, a bulk density of 0.32 g./cc., a Rosin-Rammler's constant (n) of 2.0 being obtained at 20.1 kg. PE/g. cat. of catalytic efficiency.

EXAMPLES 2-4

The process for preparation of the first catalyst component of Example 1 was respectively repeated, except changing the ratio of the titanium tetrachloride to the tri-n-butyl vanadate, and various types of the first catalyst component were used. The process for polymerization of ethylene of Example 1 was respectively repeated by using said first catalyst component and tri-isobutyl aluminum. The results are shown in Table 1.

TABLE 1

| Example | 2 | 3 | 4 |
|---|---|---|---|
| V/Ti molar ratio | 0.1 | 0.6 | 6.0 |
| Catalytic efficiency (kg. PE/g. cat.) | 25.5 | 30.0 | 31.0 |
| Average molecular weight ($\times 10^4$) | 6.0 | 6.0 | 5.5 |
| Bulk density (g./cc.) | 0.33 | 0.33 | 0.32 |
| Rosin-Rammler's constant | 4.6 | 4.0 | 4.0 |

EXAMPLES 5-7

The process of Example 1 was respectively, repeated, except using other types of organic aluminum compounds instead of tri-isobutyl aluminum. The results are shown in Table 2.

TABLE 2

| Example | 5 | 6 | 7 |
|---|---|---|---|
| Organic aluminum compound | AlEt$_3$ | Al(i-Bu)$_3$ | AlEt$_2$Cl |
| Catalytic efficiency (kg. PE/g. cat.) | 30.2 | 31.0 | 15.4 |
| Average molecular weight ($\times 10^4$) | 5.4 | 5.2 | 6.4 |
| Bulk density (g./cc.) | 0.30 | 0.30 | 0.36 |
| Rosin-Rammler's constant | 3.7 | 3.5 | 3.7 |

EXAMPLE 8

(a) Preparation of first catalyst component 100 ml. of isooctane, 20 mmoles of titanium tetrachloride and 20 mmoles of tri-n-butyl vanadate were charged to a 500 ml. flask filled with argon. The contents were reacted at 95° C. for 2 hours while stirring. The resulting product was cooled to 20° C. to which 30 mmoles of ethyl aluminum sesquichloride were added dropwise for 30 minutes while stirring. The content was further stirred for 3 hours at 20° C. and the resulting insoluble precipitate was separated and washed with n-hexane to obtain the first catalyst component.

(b) Polymerization 1 l. of n-hexane, 0.15 mmole of tri-isobutyl aluminum and 10 mg. of said first catalyst component were charged at 20° C. to 2 l. autoclave containing an atmosphere of nitrogen gas. The autoclave was heated at 90° C. and hydrogen was charged replacing nitrogen with hydrogen to obtain a hydrogen pressure of 7 kg./cm.$^2$. Ethylene was further charged at 90° C. to maintain the total pressure during the reaction at 12 kg./cm.$^2$ and the polymerization was conducted for 1 hour. As a result, 305 g. of polyethylene was obtained. Accordingly, the catalytic efficiency was 30.5 kg. PE/g. cat. The resulting polyethylene had a bulk density of 0.32 g./cc. and a melt index of 3.6 (in the examples, the melt index was measured by ASTM D-1338). The process for preparation of said first catalyst component was repeated except the isooctane, the titanium tetrachloride and the tri-n-butyl vanadate were mixed at 20° C., and the ethyl aluminum sesquichloride was added at 20° C. The polymerization process of ethylene was repeated by using 10 mg. of said first catalyst component and 0.15 mmole of tri-isobutyl aluminum. As a result, 166 g. of polyethylene was obtained. Accordingly, the catalytic efficiency was 16.6 kg. PE/g. cat.

EXAMPLE 9

The process for the preparation of the first catalyst component of Example 8 was repeated, except 20 mmoles of titanium tetrachloride and 20 mmoles of tri-n-butyl vanadate were used at 70° C. for 2 hours. The polymerization process of ethylene of Example 8 was repeated, except using 10 mg. of said first catalyst component reacting under 7 kg./cm.$^2$ of hydrogen pressure and 12 kg./cm.$^2$ of total pressure for 60 minutes. As the result, 206 g. of polyethylene was obtained. Accordingly, the catalytic efficiency was 20.6 kg. PE/g. cat. and the melt index was 4.6.

EXAMPLE 10

The process for preparation of the first catalyst component of Example 8 was repeated, except 20 mmoles of titanium tetrachloride and 20 mmoles of tri-n-butyl vanadate were used without any solvent at 90° C. for 30 minutes, and then 100 ml. of isooctane was added prior to the reduction. The polymerization process of ethylene of Example 8 was repeated, except using 10 mg. of said first catalyst component, and reacting for 60 minutes. As a result, 354 g. of polyethylene was obtained, accordingly, the catalytic efficiency was 35.4 kg. PE/g. cat. and the melt index of the resulting polyethylene was 3.5.

EXAMPLE 11

The process for preparation of the first catalyst component of Example 8 was repeated, except 20 mmoles of titanium tetrachloride, 20 mmoles of tri-n-butyl vanadate were used without any solvent at 140° C. for 30 minutes and then 100 ml. of isooctane was added prior to the reduction. The polymerization process of ethylene of Example 8 was repeated, except using 7 mg. of a said first catalyst component, and reacting 60 minutes. As a result, 348 g. of polyethylene was obtained, accordingly, the catalytic efficiency was 49.7 kg. PE/g. cat. and the melt index of the resulting polyethylene was 3.5.

EXAMPLE 12

(a) Preparation of the first catalyst component 20 mmoles of titanium tetrachloride and 20 mmoles of tri-n-butyl vanadate were mixed in an atmosphere of argon, and then were reacted at 140° C. for 30 minutes, while stirring. The resulting product was cooled to 20° C., and 100 ml. of isooctane was added to it. 30 mmoles of ethyl aluminum sesquichloride were added dropwise to it for 30 minutes, while stirring. The content was further stirred for 3 hours and the resulting insoluble precipitate was separated and washed with n-hexane to obtain the first catalyst component.

(b) Polymerization

One liter of n-hexane, 0.15 mmole of tri-isobutyl aluminum and 7 mg. of said first catalyst component were charged to a two liter autoclave in an atmosphere of nitrogen at 20° C. The autoclave was heated at 80° C. and hydrogen was charged replacing nitrogen with hydrogen to make a hydrogen pressure of 6.5 kg./cm.$^2$. Then, ethylene gas containing 1 g. of propylene was further charged at 80° C. to maintain 11.5 kg./cm.$^2$ of total pressure during the reaction, and the polymerization was conducted under constant pressure by supplying ethylene for 1 hour. As the result, 320 g. of copolymer of ethylene-propylene was obtained, accordingly, the catalytic efficiency was 45.7 kg. PE/g. cat. The melt index of the resulting copolymer was 4.5. The process for preparation of said first catalyst component was repeated, except said titanium tetrahloride and tri-n-butyl vanadate were mixed at 20° C. and said ethyl aluminum sesquichloride was added at 20° C. The process for copolymerization of ethylene-propylene was repeated by using 10 mg. of said first catalyst component and 0.15 mmole of tri-isobutyl aluminum. As the result, 170 g. of copolymer of ethylene was obtained, accordingly, the catalytic efficiency was 17.0 kg. PE/g. cat.

EXAMPLE 13

(a) Preparation of first catalyst component 500 ml. reactor was purged with argon gas, and then 100 ml. of pure cyclohexane, 90 mmoles of titanium tetrachloride and 90 mmoles of tri-n-butyl vanadate were charged to the reactor. The content was refluxed at 60° C. for 2 hours, while stirring. The total concentration of titanium tetrachloride and tri-n-butyl vanadate in the liquid phase was 1.25 moles/l. 270 mmoles of ethyl aluminum sesquichloride were dropwise added to the content by controlling at 20° C. The content was further stirred at 20° C. for 3 hours. After the reaction, the unreacted components and solvent were removed by decantation. 200 ml. of pure cyclohexane was added to the product and was stirred for 5 minutes. After about 15 minutes settlement, the supernatant liquid cyclohexane was removed by decantation. The operation of addition and decantation of cyclohexane was repeated 6 times and then the resulting product was dried at 60° C. under 1 mm. Hg in vacuum for 2 hours to obtain the powdery solid first catalyst component.

(b) Polymerization

A one liter autoclave fitted with a magnetic stirrer was purged with nitrogen gas. 500 ml. of pure n-hexane, 10 mg. of said first catalyst component and 0.15 mmole of tri-isobutyl aluminum were charged to it. The autoclave was heated at 90° C. and hydrogen was charged to a hydrogen pressure of 6.0 kg./cm.$^2$. Then ethylene was further charged to a total pressure during the reaction of 10 kg./cm.$^2$. The polymerization was conducted at 90° C. under a constant pressure of 10 kg./cm.$^2$. by supplying ethylene for 60 minutes. As a result, 165 g. of white powdery polyethylene having a bulk density of 0.45 g./cc. was obtained.

EXAMPLE 14

The process for preparing the first catalyst component of Example 13 was repeated, except the total concentration of titanium tetrachloride and tri-n-butyl vanadate in the liquid phase was 0.5 mole/l. The polymerization process of Example 13 was repeated, except using 8.5 mg. of the first catalyst component and 0.15 mmole of tri-isobutyl aluminum and reacting for 90 minutes. As a result, 186 g. of white powdery polyethylene having 0.38 g./cc. of bulk density was obtained.

EXAMPLE 15

The process for preparation of the first catalyst component of Example 13 was repeated, except the total concentration of titanium tetrachloride and tri-n-butyl vanadate in the liquid phase was 0.8 mole/l.

The process for polymerization of Example 13 was repeated, except using 8 mg. of said first catalyst component and 0.12 mmole of triisobutyl aluminum, and reacting for 90 minutes under constant pressure. As the result, 183 g. of a white powdery polyethylene having a bulk density of 0.40 g./cc. was obtained.

EXAMPLE 16

The process for preparation of the first catalyst component of Example 13 was repeated, except 270 mmoles of ethyl aluminum sesquichloride were used in 20% cyclohexane solution. The polymerization process of ethylene of Example 13 was repeated, except using 10 mg. of said first catalyst component and 0.15 mmole of tri-isobutyl aluminum, and reacting for 60 minutes under constant pressure. As a result, 210 g. of a white powdery polyethylene having a bulk density of 0.43 g./cc. was obtained.

EXAMPLE 17

The process of Example 13 was repeated, except 10 mg. of the first catalyst component and 0.16 mmole of tri-isobutyl aluminum were used and a mixture of ethylene-propylene containing an average of 4.5 mole percent of propylene to ethylene was charged instead of ethylene. 191 g. of a copolymer of ethylene-propylene having a bulk density of 0.46 g./cc. was obtained by reacting for 60 minutes under constant pressure.

EXAMPLE 18

The process for preparation of the first catalyst component of Example 13 was repeated, except 18 mmoles of titanium tetrachloride, 18 mmoles of tri-n-butyl vanadate (the total concentration of said two components was about 0.035 mole/l.) and 54 mmoles of ethyl aluminum sequichloride (adding period 20 minutes) were used. The constant pressure polymerization of ethylene of Example 13 was repeated, except using 6.4 mg. of said first catalyst component and 0.10 mmole of tri-isobutyl aluminum. 89 g. of white powdery polyethylene having a bulk density of 0.32 g./cc. was obtained by reacting for 60 minutes.

EXAMPLE 19

The process for preparation of the first catalyst component of Example 13 was repeated, except the reaction temperature for reacting the mixture of titanium tetrachloride and tri-n-butyl vanadate with ethyl aluminum sesquichloride was −5° C. The constant pressure polymerization of ethylene of Example 13 was repeated, except using 7 mg. of said first catalyst component and 0.10 mmole tri-isobutyl aluminum. 102 g. of white powdery polyethylene having a bulk density of 0.27 g./cc. was obtained by reacting for 60 minutes.

Having now fully described the invention, it will be apparent to one of ordinary skill in the art that many changes and modifications can be made without departing from the spirit or scope of the invention.

Accordingly, what is claimed as new and intended to be covered by Letters Patent is:

1. In a process for the slurry polymerization of ethylene or a mixture of ethylene and up to about 4.5 mole percent of a comonomer having the general formula: $CH_2=CH-R$, wherein R is a hydrocarbon residue of 1–18 carbon atoms, in the presence of a catalyst, the improvement wherein said catalyst is prepared by reducing a mixture of titanium tetrahalide and trialkyl vanadate with dialkyl aluminum monohalide or alkyl aluminum sesquihalide in an inert solvent at a temperature of 0 to 30° C. in a condition of total concentration of titanium compound and vanadium compound of more than 0.5 mole/l. and the ratio of the trialkyl vanadate to titanium tetrahalide (V/Ti) of 0.1 to 10, to prepare a first hydrocarbon insoluble catalyst component which is separated and then admixed with a second catalyst component of an organoaluminum compound having the general formula $AlR'_nX_{3-n}$ wherein R' represents hydrogen, alkyl group or aryl group; X represents halogen atom, alkoxy group or trialkyl siloxy group; and n represents an integer of 1 to 3.

2. The process of claim 1, wherein said mixture is reduced with alkyl aluminum sesquihalide.

3. The process of claim 1, wherein the trialkyl vanadate is selected from the group consisting of trimethyl vanadate, triethylvanadate, tri-n-propyl vanadate, triisopropyl vanadate, tri-n-butyl vanadate, and triisobutyl vanadate.

4. The process of claim 1, wherein the ratio of the second catalyst component to the first catalyst component is 1 to 30, in terms of Al/Ti+V (molar ratio).

5. The process of claim 1, wherein the mixture of titanium tetrahalide and trialkyl vanadate in an inert solvent is heated at a temperature of 70° C. to 170° C., prior to reduction with the organo-aluminum compound.

6. The process of claim 1, wherein the polymerization is carried out at 50° to 100° C.

7. The process of claim 1, wherein the titanium tetrahalide is titanium tetrachloride and the trialkyl vanadate is tri-n-butyl vanadate.

8. The process of claim 1, wherein the total concentration of titanium compound and vanadium compound is in the range of 1 to 3 moles/1.

References Cited
UNITED STATES PATENTS

| | | | |
|---|---|---|---|
| 3,218,266 | 11/1965 | Ludlum | 260—94.9 E |
| 3,696,086 | 10/1972 | Wagensommer | 260—88.2 R |

FOREIGN PATENTS

| | | |
|---|---|---|
| 2,012,697 | 3/1970 | France. |
| 1,187,466 | 4/1970 | Great Britain. |

JOSEPH L. SCHOFER, Primary Examiner

E. J. SMITH, Assistant Examiner

U.S. Cl. X.R.

252—429 C; 260—85.3 R, 93.5 S, 94.9 E

UNITED STATES PATENT OFFICE
CERTIFICATE OF CORRECTION

Patent No. 3,766,158   Dated October 16, 1973

Inventor(s) Kazuo Yamaguchi et al.

It is certified that error appears in the above-identified patent and that said Letters Patent are hereby corrected as shown below:

Column 3, line 6, the value for n reading "1-3" should read -- 1.5 -3 --.

Signed and sealed this 12th day of November 1974.

(SEAL)
Attest:

McCOY M. GIBSON JR.
Attesting Officer

C. MARSHALL DANN
Commissioner of Patents